United States Patent [19]

Gajewski

[11] Patent Number: 5,223,599
[45] Date of Patent: Jun. 29, 1993

[54] POLYURETHANE ELASTOMER AND NON-PNEUMATIC TIRE FABRICATED THEREFROM

[75] Inventor: Vincent J. Gajewski, Cheshire, Conn.

[73] Assignee: Uniroyal Chemical Company, Inc., Middlebury, Conn.

[21] Appl. No.: 866,636

[22] Filed: Apr. 10, 1992

[51] Int. Cl.$^5$ .............................................. C08G 18/00
[52] U.S. Cl. ........................................ 528/59; 528/60; 528/64; 152/452; 152/525; 152/564
[58] Field of Search ........................... 528/59, 60, 64; 152/452, 525, 564

[56] References Cited

U.S. PATENT DOCUMENTS

| | | | |
|---|---|---|---|
| 4,595,742 | 6/1986 | Nalepa et al. | 528/64 |
| 4,934,425 | 6/1990 | Gajewski et al. | 152/323 |
| 4,975,515 | 12/1990 | Nalepa et al. | 528/64 |

*Primary Examiner*—Maurice J. Welsh
*Attorney, Agent, or Firm*—Raymond D. Thompson

[57] ABSTRACT

A polyurethane elastomer exhibiting superior flex fatigue properties is obtained by reacting a mixture of isocyanate-terminated polyether prepolymers with at least one alkylthioaromatic amine curing agent. Optionally, the elastomer can be postcured for further improvement of its properties. The polyurethane elastomer can be utilized for the fabrication of a non-pneumatic tire.

58 Claims, 2 Drawing Sheets

POLYURETHANE ELASTOMER AND NON-PNEUMATIC TIRE FABRICATED THEREFROM

BACKGROUND OF THE INVENTION

This invention relates to a polyurethane elastomer exhibiting superior flex fatigue properties prepared from a mixture of isocyanate-terminated polyether prepolymers and alkylthioaromatic amine curative and to a non-pneumatic tire fabricated from the elastomer.

Urethanes have been used in the manufacture of solid tires useful for such applications as industrial tires, off-the-road tires, bicycle tires and the like. They have not been entirely satisfactory in such applications because such urethane solid tires do not have the proper cushioning and handling characteristics for a soft vehicle ride on such applications as passenger vehicles. Also such solid tires suffer from internal heat build-up and subsequent degradation of the elastomer material in prolonged high speed service conditions or under rough terrain situations where the tire is being deformed.

As described in U.S. Pat. No. 4,934,425, a non-pneumatic tire exhibiting improved hysteresis and flex fatigue properties is fabricated from a resilient polyether urethane elastomeric material formed of a first isocyanate end capped low molecular weight polyether polyol having a molecular weight of between 200 and 1,500 and a second high molecular weight isocyanate end capped polyether polyol having a molecular weight between 1,500 and 4,000 cured with an aromatic diamine curative, e.g., 4,4'-methylene bis(2-chloroaniline), also referred to as MBOCA, which is preferred. While the performance of this tire is excellent, some concern has been expressed with regard to the use of MBOCA as the chain extender, or curative, for the polyurethane elastomer from which the tire body is manufactured. MBOCA is a suspected carcinogen and therefore it would be desirable to provide a polyurethane elastomer, suitable for manufacturing a non-pneumatic tire, which exhibits performance characteristics at least as good as those of the polyurethane elastomer of U.S. Pat. No. 4,934,425 but is obtained with a non-carcinogenic curative.

SUMMARY OF THE INVENTION

It is an object of the invention to provide a polyurethane elastomer exhibiting superior flex properties prepared with a non-carcinogenic curative.

It is a particular object of the invention to provide such a polyurethane elastomer from a mixture of isocyanate-terminated polyether prepolymers and at least one alkylthioaromatic amine curing agent.

It is yet another object of the invention to provide a non-pneumatic tire fabricated from the alkylthioaromatic amine-cured polyurethane elastomer.

By way of meeting these and other objects of the invention, there is provided a polyurethane elastomer obtained by reacting (a) a mixture of isocyanate-terminated polyether prepolymers formed from the reaction of (i) a first polyether having a molecular weight of from about 200 to about 1,500 and terminated with functional groups containing active hydrogen, (ii) a second polyether having a molecular weight of from above about 1,500 to about 6,500 and terminated with functional groups containing active hydrogen and (iii) a multifunctional isocyanate and (b) alkylthioaromatic amine curing agent under polyurethane elastomer-forming conditions.

Further in accordance with the invention, there is provided a non-pneumatic tire fabricated from the foregoing polyurethane elastomer.

The alkylthioaromatic amine curing agent employed in the preparation of the polyurethane elastomer of this invention is non-carcinogenic. The polyurethane elastomer and the non-pneumatic tire manufactured from the elastomer exhibit performance characteristics comparable to those of the polyurethane elastomer and non-pneumatic tire of U.S. Pat. No. 4,934,425, the contents of which are incorporated by reference herein.

DESCRIPTION OF THE PREFERRED EMBODIMENTS

The Non-pneumatic Tire of the Invention

Figure 1:
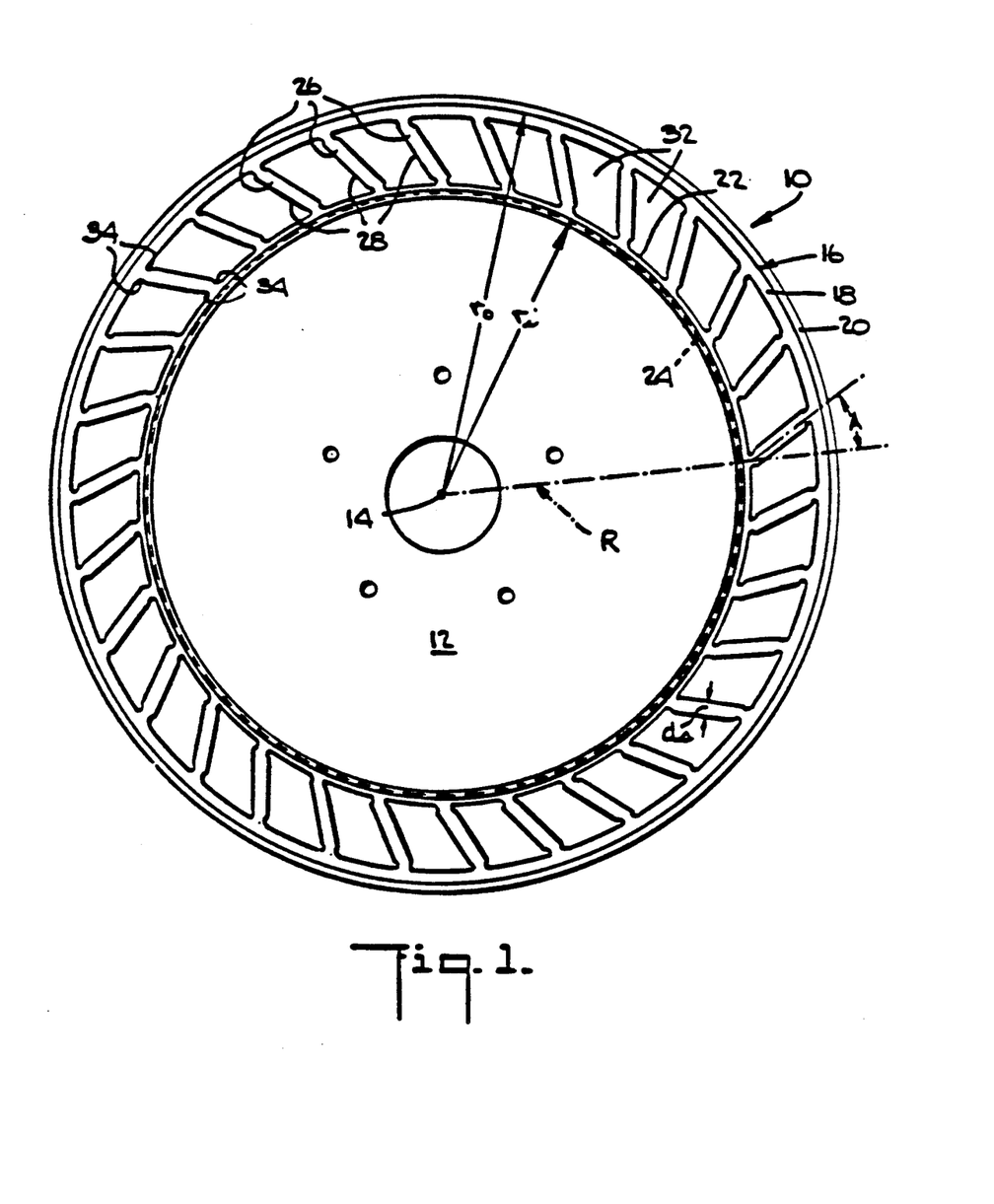
FIG. 1 is a side elevation view of a non-pneumatic tire and rim assembly in accordance with the invention.
Figure 2:
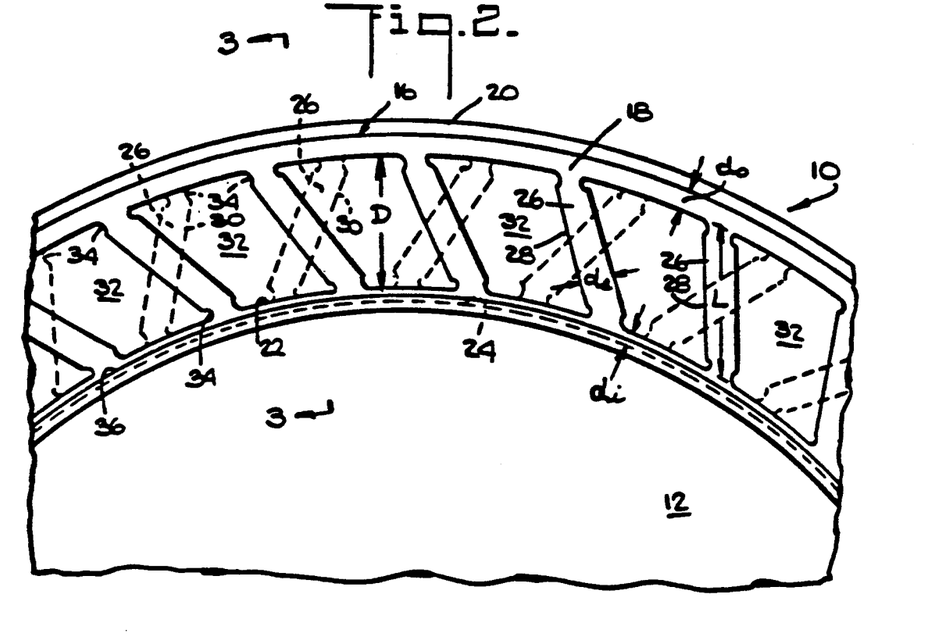
FIG. 2 is an enlarged fragmentary view of a portion of the tire and rim assembly shown in FIG. 1 showing the compression deformable, load carrying annular body thereof in greater detail.
Figure 3:
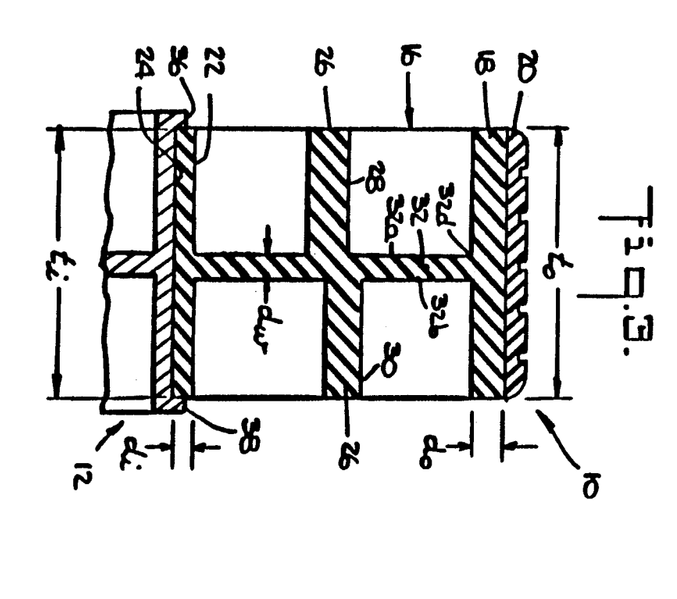
FIG. 3 is a sectional elevation view taken along line 3-3 of the tire and rim assembly of FIG. 2.

Referring to FIGS. 1, 2 and 3 wherein a preferred embodiment of the non-pneumatic tire of this invention is illustrated, a tire 10 is shown mounted on a wheel 12 for rotation about an axis 15. The tire 10 comprises an annular body 16 fabricated from the polyurethane elastomer of this invention and having an outer cylindrical member 18 at the outer periphery thereof on which a tread 20 may be mounted. The annular body 16 is also provided with an inner cylindrical member 22 at its inner periphery which is adhered to or otherwise fastened to an outer cylindrical surface 24 of wheel rim member 12. Inner cylindrical member 22 is of the same length as, coaxial to, and coextensive with, outer cylindrical member 18.

The outer cylindrical member 18 is supported and cushioned by a plurality of circumferentially spaced apart rib members 26, each which includes a first axial portion 28 (FIG. 3) and a second axial portion 30, and by a web member 32, which in the embodiment shown is planar and is connected on one of its side faces 32a to the first portion 28 of rib members 26 and is connected on its outer side face 32b to the second portion 30 of rib members 26.

The planar web member 32 is positioned midway between the axial ends of the inner and outer cylindrical members 18 and 22. It is connected at its inner periphery at its outer periphery 32d to the outer cylindrical member 18. Similarly, the various rib members 26 (FIG. 2) are connected at their radially inner ends to the inner cylindrical member 22 and at their radially outer ends to the outer cylindrical member 18. The ribs 26 are preferably undercut where their ends connect to the inner and outer cylindrical members, as shown at 34, to enhance flexibility of the connection.

The rib members 26 extend generally axially along the inner and outer cylindrical members 22 and 18 (FIG. 3) and, in the preferred embodiment as shown in FIG. 1 are inclined at an angle A (FIG. 1) of 15° to 75° to radial planes R which intersect them at their functions with the inner cylindrical member 22. In an alternate embodiment (not shown), the rib members 26 can be extended radially with no angle A or with a lesser angle of this embodiment lies in a plane that is perpendicular to the rotational axis 14 of the tire 10.

In the embodiment shown in FIGS. 1 to 3, the first axial rib member portions 28 and the second axial rib member portions 30 are each inclined at the same angle to the radial planes R which intersect them at their radially inner ends but the angles of the first portions 28 are preferably oppositely directed with respect to the radial planes R from the angles of the second portions 30. Thus, as viewed in FIG. 3, the first rib portion proceeds upwardly from the section lines to connect with the outer cylindrical member 18, while the second rib portion 30 proceeds downwardly from the section lines to connect with the inner cylindrical member 22.

In FIGS. 1-3, "$r_o$" is the outer radius of the annular body 16, "A" is the inclination angle that the rib members 26 make with the radial planes R, "$d_i$" is the radial thickness of the inner cylindrical member 22, "$d_o$" is the radial thickness of the outer cylindrical member 18, "L" is the angularly directed length of the rib members 26, "D" is the radial distance from the outer surface of the inner cylindrical member 22 to the inner surface of the outer cylindrical member 18, "$d_w$" is the axial thickness of the web member 32, "$d_s$" is the thickness of the rib member 26 measured perpendicularly to its length L, "$t_i$" is axial length of the outer cylindrical member 28, and "$t_o$" is the axial length of the outer cylindrical member 28 and "$t_i$" is the radial dimension of the inner surface of the inner cylindrical member 22.

In a tire of the type shown in FIGS. 1-3, the rib members 26 are constrained to deform primarily in compression by the influence of the web member 32, which may be cast as an integral part of the structure. The web member 32 tends to prevent the rib members 26 from deforming in bending, and the effect is to greatly increase structural stiffness. In addition, the rib members 26 tend to prevent the web member 32 from buckling in the axial direction so the rib members and web member work together synergistically to carry tire loads.

Another desirable characteristic of a nonpneumatic tire or any tire is an overall spring rate that changes depending on the type of surface against which the tire is loaded. Specifically, it is desirable that the spring rate be lower over a bump or cleat than over a flat surface.

The annular body 16 may be adhered to the surface 24 of the wheel rim 12 by being molded directly thereto in a liquid injection molding process, with the outer cylindrical surface 24 of the rim having been prepared in accordance with known processes to adheringly receive the elastomeric material of the body 16. Preferably, the wheel rim 12 is provided with radial flanges 36 and 38 which cooperate with the mold in forming the annular body 16 on the wheel rim surface 24.

The tire can be conveniently made in a mold having an inner cavity of complementary shape to the tire 10 shown in FIGS. 1-3. The mold may have an inner mold ring substituted in place of the wheel rim 12. The mold is filled with a reaction mixture of the preferred components of the invention.

The polyurethane elastomer-forming reaction mixture, described in detail below, is added to the mold under sufficient pressure to insure that all air in the mold is displaced by liquid reaction mixture. It has been found that pressure in the area of 450 kPa is a suitable pressure. Once the mold is filled it is heated for about one hour for the purpose of curing the liquid reactants. Subsequently, the mold is opened and the annular body 16 is demolded and post-cured for a suitable number of hours.

A simple tire tread composed of tough abrasion-resistant elastomer such as conventional tire treads is applied to the outer cylindrical member 18. The tread has a minimal thickness to assure little heat build-up during flexing. A thickness of about 0.6 cm has been found suitable. The tread may be adhered by conventional and well-known adhesives which vary depending on the composition of the tread. If an inner mold ring has been substituted for the wheel rim 12, the rim 12 must be adhered by suitable adhesives to the inner surface of the annular body 16. The resulting assembly can be used to replace a conventional passenger car tire and wheel assembly. A car with the tire and wheel assembly can be driven without deleteriously affecting control of the car without damage to the non-pneumatic tire of the invention.

The Polyurethane Elastomer of the Invention

The polyethers used in preparing the polyurethane elastomer of this invention are polyethers having a terminal functional group containing active hydrogen capable of reacting with an isocyanate group. The functional group is selected from the group consisting of hydroxyl group, mercapto group, amino group and carboxyl group. Suitable polyethers include the polyether polyols and, in particular, poly(oxyalkylene) ether glycols such as the poly(oxyethylene) ether glycols, the poly(oxypropylene) ether glycols, the polytetramethylene ether glycols, and the like, poly(oxyalkylene) ether triols such as the poly(oxypropylene) ether triols, and the like, poly(oxyalkylene) ether dicarboxylic acids, the poly(oxyalkylene) ether dithiols, the poly(oxyalkylene) ether diamines and their pre-extended polymers, and so forth. The preferred polyethers are the poly(oxyalkylene) ether glycols, the more preferred polyethers being the polytetramethylene ether glycols (PTMEGs).

The polyurethane elastomer of this invention is prepared from a mixture of two or more different polyethers having molecular weights which are different from each other. In general, a first polyether having a molecular weight of from about 200 to about 1,500 and a second polyether having a molecular weight of from above about 1,500 to about 4,000 are utilized in the preparation of the prepolymer. A preferred range for the low molecular weight polyether is from about 250 up to about 1,000 or slightly above. For the higher molecular weight polyether, the preferred range is just below 2,000 up to about 3,000. The more preferred mixture of polyethers contains a first polyether of about 1,000 molecular weight and a second polyether of about 2,000 molecular weight. The first and second polyethers can be blended in molar ratios of from about 95:5 to about 50:50 where the first number in the ratio is always the low molecular weight polyether (or mixture of such polyethers) and the second number is the higher molecular weight polyether (or mixture of such polyethers). A preferred molar ratio range is from about 90:10 to about 60:40, the preferred range being from about 85:15 to about 80:20.

The mixture of polyether prepolymers is formed by reacting the first and second polyethers with a multifunctional isocyanate. The polyethers can be reacted with a multifunctional isocyanate individually and thereafter combined or they can be preblended and reacted with the isocyanate, the latter procedure generally being preferred for the sake of simplicity.

Polyfunctional isocyanates used in this invention are not particularly limited but are preferably aromatic and aliphatic diisocyanates and triisocyanates. The aromatic diisocyanates include, for example tolylene-2,4-diisocyanate; tolylene-2,6-diisocyanate; naphthalene-1,5-diisocyanate; diphenyl-4,4'-diisocyanate; diphenylmethane-4,4'-diisocyanate; dibenzyl-4,4'-diisocyanate; stilbene-4,4'-diisocyanate; benzophenone-4,4'-diisocyanate and their derivatives substituted with alkyl, alkoxy, halogen or nitro groups, e.g., 3,3'-dimethylphenyl-4,4'-diisocyanate or 3,3'-dichlorophenylmethane diisocyanate; and, mixtures of any of the foregoing.

Among the aforementioned isocyanates, there may be preferably used tolylene-2,4-diisocyanate; tolylene-2,6-diisocyanate; naphthalene-1,5-diisocyanate; diphenylmethane-4,4'-diisocyanate; 1,6-hexamethylene diisocyanate; 1,3 and 1,4-cyclohexyl diisocyanate; methylene bis(4-cyclohexyl diisocyanate); 1,3-and 1,4-xylene diisocyanate and mixtures of any of the foregoing.

The ratio of isocyanate to polyol is commonly expressed in the art as NCO:OH ratio. The isocyanate to hydroxyl ratio herein can be in the range of from about 1.7:1 to about 2.3:1. A preferred range of ratios is from about 1.85:1 to about 2.2:1. The preferred range of ratios is from about 1.95:1 to about 2.15:1. The percentage of free NCO in the resulting prepolymer is also in common use for characterizing prepolymers.

The foregoing mixture of polyether prepolymers is cured to provide the polyurethane elastomer of this invention employing at least one alkylthioaromatic amine, e.g., any of the aromatic amine chain extenders disclosed in U.S. Pat. No. 4,595,742, the contents of which are incorporated by reference herein.

The aromatic amine chain extenders of U.S. Pat. No. 4,595,742 comprise, and preferably predominantly contain, aromatic amines having at least two alkylthio substituents and at least one amino substituent on the same aromatic ring of the amine. Alkylthio groups contain an alkyl group bound to the aromatic nucleus through a sulfur group. The alkyl group may contain 1 to 50 carbon atoms of linear, cyclic, or branched structure, preferably 1 to 20 carbon atoms and more preferably 1 to 6 carbon atoms. The aromatic amines may have one, two or more aromatic rings so long as a total of at least two amino groups are present as substituents on the aromatic rings and so long as one aromatic ring has at least two alkylthio substituents and at least one amino substituent.

A preferred class of aromatic amine curing agents has the following structure:

wherein R' is the same or different alkyl group, and is preferably a $C_1$ to $C_{20}$ alkyl group and more preferably a $C_1$ to $C_6$ alkyl group; R is the same or different and is selected to be hydrogen or any other substituent which does not adversely affect polyurethane formation such as an alkyl, aryl, alkaryl, aralkyl, alkenyl, alkoxy or carboalkoxy group, or nitro, halogen, etc., and is preferably hydrogen or a $C_1$ to $C_6$ alkyl group; n is 2 or 3 and is preferably 2; p is 2 or 3 and is preferably 2; and q is 1 or 2.

The foregoing preferred class of curing agents includes the substituted (preferably alkyl substituted) and unsubstituted di(alkylthio) diaminobenzenes, preferably the di(methylthio)diaminobenzenes.

Among the preferred dialkylthio aromatic diamine curing agents which can be used herein, singly or in combination, are the following:

2,4-di(methylthio)-meta-phenylenediamine;
4,6-di(methylthio)-meta-phenylenediamine;
2,4-di(ethylthio)-meta-phenylenediamine;
4,6-di(ethylthio)-meta-phenylenediamine;
2,4-di(n-butylthio)-meta-phenylenediamine;
2,5-di(methylthio)-meta-phenylenediamine;
2-(methylthio)-4-(ethylthio)-meta-phenylenediamine;
3,5-di(methylthio)-2,4-diaminotoluene;
3,5-di(ethylthio)-2,4-diaminotoluene;
3,5-di(methylthio)-2,6-diaminotoluene;
3,5-di(propylthio)-2,4-diaminotoluene;
3-(methylthio)-5-(ethylthio)-2,4-diaminotoluene;
3,5-di(methylthio)-2,4-diamino-ethylbenzene;
3,5-di(ethylthio)-2,6-diamino-ethylbenzene;
3,5-di(cyclohexylthio)-2,4-diaminotoluene;
3-(methylthio)-5-(propylthio)-2,6-diamino-ethylbenzene;
3,5-di(methylthio)-2,4-diamino-chlorobenzene;
3,6-di(ethylthio)-2,4-diamino-chlorobenzene;
4,4'-methylenebis[2,6-di(methylthio)aniline];
[3,5-di(methylthio)-4-aminophenyl[3-(methylthio-4aminophenyl]methane;
4,4'-ethylidenebis[2,6-di(ethylthio)aniline];
4,4'-isopropylidenebis[2,6-di(methylthio)aniline];
[3,5-di(methylthio)-4-aminophenyl][3-5-di(ethylthio)-4aminophenyl]sulfide;
phenyl[3,5-di(methylthio)-2,4-diaminophenyl]methane;
2,6-diamino-3,5-di(n-butylthio-4-bromotoluene; and,
[3,5-di(methylthio)-4-aminophenyl][3,5-di(ethylthio)-4aminophenyl]ether.

Ethacure ® 300 (Ethyl Corporation, Baton Rouge, La.), an 80:20 weight ratio mixture of 3,5-di(methylthio)2,6-diaminotoluene and 3,5-di(methylthio)-2,4-diaminotoluene, has been used herein with generally good results.

The stoichiometry of the mixture of polyether prepolymers to alkylthioaromatic amine curative is expressed on a molar equivalence basis, hereinafter referred to as "equivalence ratio", rather than on a weight basis. The broadest equivalence ratio of polyether prepolymer mixture to curative is from about 80 to about 125, preferably from about 100 to about 120 and more preferably from about 110 to about 115. The equivalence ratio is also commonly referred to as "percent of theory" or simply "stoichiometry".

As will be appreciated from the following, the polyurethane elastomer herein is advantageously postcured, preferably by application of heat. A postcuring temperature of from about 115° C. to about 160° C., preferably from about 120° C. to about 140° C. and most preferably from about 130° C. to about 135° C. is suitable in most cases.

It has been found through a long process of experimentation that several dynamic properties of elastomers must be carefully evaluated together in order to produce an elastomer suitable for the annular elastomeric body of the tire of this invention. A measure of dynamic modulus must reveal that the chosen elastomeric material has a relatively constant dynamic modulus over a wide temperature range. The tendency of the elastomer to build up internal heat due to elastic inefficiency is commonly called hysteresis in the industry. The hysteresis is commonly expressed in terms of a value obtained from a hysteresis-type test referred to as "tangent delta" or, more commonly, "tan δ". The tan δ should show a decrease with a rise in temperature, indicating little internal heat build-up is occurring in the elastomeric body of article being tested.

The flex fatigue test helps measure the ability of the elastomer to withstand the millions of cycles to which a non-pneumatic tire may be subjected. The test which has been found to correlate favorably with actual test tires is the cut growth resistance as run in accordance with ASTM D-3629-78. Test conditions are: temperature 70° C., atmosphere is air, rate of rotation is 500 rpm and strain is 23%. The flex measurement instrument utilized for this test is the TEXUS ® Flex tester available from Testing Machines, Inc., New York, Model No. 31-11.

Determination of the curative used in polyurethane elastomers can be accomplished by X-ray fluoresence by such instruments as the Panalyzer ® or similar instruments such as those manufactured by Asoma Instrument Co. of Austin, Tex., Princeton Gammatech, Princeton, N.J. (Model 100), or Oxford Analytical, Andover, Mass.

Dynamic measurements to determine a tan δ value are useful for assuring that a suitably low hysteresis value is obtained for the material. Several hysteresis devices are useful including the Rheovibran Tester, Hysterometer, and the Rheometrics Viscoelastic Tester for Solids, Model RVE-S, from Rheometrics, Inc., New Jersey. These instruments apply a sinusoidal shear strain to the specimen and analyze the torque response and phase relation to the strain.

The ultimate test of the suitability of an elastomer for use in a high speed tire is its ability to resist heat build-up and degradation at prolonged high speed service. The United States Department of Transportation has developed a test designated MVSS 109 high speed test procedure S5.5 in which the test wheel and tire is run on a dynamometer at carefully prescribed strain loads, dynamometer speeds and time periods. This test is designed for a pneumatic tire. The following is a simplified presentation of the test procedure; more specific details of the procedure can be obtained by review of MVSS 109. Load (NPS) 92% of maximum rated load in a 40° C. elevated temperature environment. Table I shows the speed intervals at which the tires described in the examples were run. The MVSS 109 test calls for test termination after 3½ hours (top speed 85 mph). However, in order to induce failure in the test tires, the test was continued as noted in Table I with incremental speed increased until the tires failed.

TABLE I

| | MVSS 109 TEST METHOD | | |
|---|---|---|---|
| | MVSS 109 Test Conditions | | |
| | Speed (MPH) | Internal (Hours) | Cumulative (Hours) |
| Load (NPS) 0.92 max load | 50 | 2 | 2 |
| | 75 | ½ | 2½ |
| | 80 | ½ | 3 |
| | 85 | ½ | 3½* |
| | 90 | ½ | 4 |
| | 95 | ½ | 4½ |
| | 100 | ½ | 5 |

TABLE I-continued

| MVSS 109 TEST METHOD | | |
|---|---|---|
| MVSS 109 Test Conditions | | |
| Speed (MPH) | Internal (Hours) | Cumulative (Hours) |
| 105 | ½ | 5½ |
| 110 | ½ | 6 |
| 115 | ½ | 6½ |
| 120 | ½ | 7 |
| 125** | ½ | 7½ |

*MVSS 109 is discontinued after 3½ hours @ 85 mph.
**125 mph maintained for any additional time periods.

In order to determine the ultimate capacity of a tire to withstand highway conditions, the test was run beyond its normal termination time of 3½ hours to bring out the differences in performance in the materials used in the manufacture of the tire bodies. Therefore, the life of the tire in hours may exceed the 3½ hour test specified in the MVSS 109 Test Method.

EXAMPLE

A mixture of isocyanate-terminated polyether prepolymers was prepared as in U.S. Pat. No. 4,934,425 by reacting one mole of a mixture of polytetramethylene ether glycols in an 85:15 equivalent ratio of 1000:2000 molecular weight.

A portion of the resulting mixture of prepolymers was then reacted with 4,4'-methylene bis 2-chloroaniline (MBOCA) at 95 and 105% stoichiometry at 212° F. to provide a polyurethane elastomer representative of those of U.S. Pat. No. 4,934,425.

Another portion of the foregoing mixture of prepolymers was reacted with Ethacure ® 300 ("E300"), the 80:20 weight ratio mixture of 3,5-di(methylthio)-2,6-diaminotoluene and 3,5-di(methylthio)-2,4-diaminotoluene curatives referred to above, to provide the polyurethane elastomer of this invention.

As those skilled in this art are aware, it may be necessary or desirable to preheat the prepolymer mixture and/or curing agent to facilitate handling of the materials. If a small sample is being prepared for physical testing, the mixing is done batchwise in appropriate quantities.

Typically when the foregoing prepolymers are cured at temperatures higher than 100° C., crosslinking and-/or thermal oxidative degradations take place causing a loss in TEXUS flex. It is generally agreed that for tires, greater than 50,000 flex cycles are desirable.

In Table II below, TEXUS flex values are given for samples of varying stoichiometry using either MBOCA or E-300 as the curative at cure temperatures of 100° C. and 130° C.

TABLE II

| TEXUS FLEX DATA | | | |
|---|---|---|---|
| Cured 16 hours at 100° C. | | | |
| Stoichiometry | 95% | 105% | 115% |
| MBOCA | 5000 | 50000 | 40000 |
| E-300 | 1000 | 2500 | 30000 |
| Cured 16 hours at 130° C. | | | |
| Stoichiometry | 95% | 105% | 115% |
| MBOCA | 1000 | 30000 | 7000 |
| E-300 | <1000 | 5000 | 75000 |

Higher curing temperature is expected to degrade the elastomer and cause a corresponding reduction in the flex cycles. In Table II, the results of the hotter cure cycle (130° C.) reveal a loss in TEXUS flex for those samples cured with MBOCA and show that the samples cured with MBOCA are weaker than those cured with E-300.

Table II also shows a surprising result in the improvement in TEXUS flex cycles for those samples cured with E-300. The very high value for TEXUS flex for E-300 at 115% stoichiometry and a cure temperature of 130° C. (75,000) is more than a ten-fold improvement over the value observed for the sample cured with MBOCA under the same conditions (7,000). Furthermore, the sample cured at 130° C. with E-300 surprisingly withstood more than twice the TEXUS flex cycles than did the sample cured at 100° C. with E-300 (30,000).

Table III below presents experimental data showing the comparative effects of added postcure to tires made from the polyurethane elastomer of the present invention employing E-300 as the curing agents and polyurethane elastomers prepared with MBOCA as the curing agent in accordance with U.S. Pat. No. 4,934,425. Postcure is the curing of an article after fabrication employing further heat. This technique is intended to improve the properties of the material and is widely used in the manufacture of reinforced plastics.

Tires made with E-300 (Samples 5-10 of Table III) were postcured and the complex modulus, tan δ and MVSS 109 tests were run on both the added postcured and the std-postcured tires.

TABLE III
COMPARATIVE EFFECTS OF ADDED POSTCURE

| | | | Std Postcure (PC) | | Added Postcure (PC) | | | | |
|---|---|---|---|---|---|---|---|---|---|
| SAMPLE | CURATIVE | STOICHIOMETRY[1] | $E^{*2}$ Kg/cm$^2$ | tan δ[3] | $E^{*2}$ Kg/cm$^2$ | tan δ[3] | PC (Hrs) | (°C.) | MVSS[4,5] 109 |
| 1 | MBOCA | 105 | 966 | 0.175 | 1007 | 0.185 | | | |
| 2 | MBOCA | 104 | 877 | 0.184 | | | | | |
| 3 | MBOCA | 103 | 915 | 0.176 | | | | | 4.6$^{SUS}$4 |
| 4 | MBOCA | 101 | 887 | 0.178 | | | | | 6$^{SUL}$5 |
| 5 | E-300 | 116 | 684 | 0.211 | 827 | 0.181 | 2 | 163 | |
| 6 | E-300 | 115 | 688 | 0.211 | 802 | 0.171 | 2 | 163 | 4.1$^{SUS}$ |
| 7 | E-300 | 113 | 662 | 0.213 | 824 | 0.172 | 2 | 163 | |
| 8 | E-300 | 105 | — | — | 864 | 0.168 | 13 | 146 | 5.6$^{SUS}$ |
| 9 | E-300 | 110 | 693 | 0.221 | 813 | 0.194 | 13 | 146 | |
| 10 | E-300 | 114 | 745 | 0.222 | 842 | 0.185 | 13 | 146 | 43$^{SUL}$ |

[1]As determined by Panalyzer ® X-ray fluorescence.
[2]E* is the complex modulus, a measure of the load-bearing ability of the material as measured by hysteresis.
[3]The value of tan δ is proportional to the ratio of energy dissipated per cycle to the maximum potential energy stored during a cycle, as measured by hysteresis.
[4]MVSS 109 run at stepped up speed (SUS).
[5]MVSS 109 run at stepped up load (SUL).
STD Postcure-100° C. 16 for hours According to the data set forth in Table III, the tan δ values decrease an average of 17% indicating little internal heat build-up in the elastomeric body of the tire. The complex modulus, expressed as E* in kg/cm$^2$, is a measurement of the load bearing capability of the material, or its stiffness. The values of E* increase by about 20% for those samples tested with and without the high temperature (146°-163° C.) postcure indicating an increase in the load-bearing ability of the tire being tested.

The improvements realized from the addition of high temperature postcure as detailed above are entirely surprising and unexpected. Elastomeric tire bodies cured with MBOCA cannot withstand the high temperature postcure and therefore could not be tested for a direct comparison with the E-300-cured tire bodies.

The data in the preceding tables show that mixtures of tire bodies fabricated from the alkylthio amine-cured polyurethane elastomers of this invention are more resistant to road stress and degradation than those cured with MBOCA. In addition, the use of an alkylthioaromatic amine curative does not pose the environmental objections as does the use of MBOCA.

It will be readily apparent to the skilled practitioner in the art that many modifications and changes can be made to the embodiments specifically documented herein. Such modification and changes are a part of the invention if they fall within the scope of the invention defined in the appended claims hereto.

What is claimed is:

1. A polyurethane elastomer obtained by reacting (a) a mixture of isocyanate-terminated polyether prepolymers formed from the reaction of (i) a first polyether having a molecular weight of from about 200 to about 1500 and terminated with functional groups containing active hydrogen, (ii) a second polyether having a molecular weight of from above about 1,500 to about 6,500 and terminated with functional groups containing active hydrogen and (iii) a multifunctional isocyanate and (b) alkylthioaromatic amine curing agent having at least two amino groups under polyurethane elastomer-forming conditions.

2. The polyurethane elastomer of claim 1 wherein the first and second polyethers are polyether polyols.

3. The polyurethane elastomer of claim 1 wherein the first and second polyethers are polytetramethylene ether glycols.

4. The polyurethane elastomer of claim 1 wherein the first polyether has a molecular weight of from about 250 to about 1,000 and the second polyether has a molecular weight of from about 2,000 to about 3,000.

5. The polyurethane elastomer of claim 1 wherein the first polyether has a molecular weight of about 1,000 and the second polyether has a molecular weight of about 2,000.

6. The polyurethane elastomer of claim 1 wherein the molar ratio of first polyether to second polyether is from about 95:5 to about 50:50.

7. The polyurethane elastomer of claim 1 wherein the molar ratio of first polyether to second polyether is from about 90:10 to about 60:40.

8. The polyurethane elastomer of claim 1 wherein the molar ratio of first polyether to second polyether is from about 85:15 to about 80:20.

9. The polyurethane elastomer of claim 1 wherein the isocyanate is selected from the group consisting of 2,4 toluene diisocyanate, 2,6 toluene diisocyanate and mixtures thereof.

10. The polyurethane elastomer of claim 1 wherein the first and second polyethers are polyether polyols and the isocyanate to hydroxyl ratio is from about 1.7:1 to 2.3:1.

11. The polyurethane elastomer of claim 1 wherein the first and second polyethers are polyether polyols and the isocyanate to hydroxyl ratio is from about 1.85:1 to about 2.1:1.

12. The polyurethane elastomer of claim 1 wherein the first and second polyethers are polyether polyols and the isocyanate to hydroxyl ratio is from about 1.95:1 to about 2.15:1.

13. The polyurethane elastomer of claim 1 wherein the alkylthioaromatic amine curing agent possesses at least one aromatic group having thereon at least two alkylthio substituents and at least one amino substituent.

14. The polyurethane elastomer of claim 1 wherein the alkylthioaromatic amine curing agent possesses the structure wherein R' is the same or different alkyl group; R is the same or different and is hydrogen or other substituent which does not adversely affect polyurethane formation; n is 2 or 3, p is 2 or 3 and q is 1 or 2.

15. The polyurethane elastomer of claim 1 wherein the alkylthioaromatic amine curing agent possesses the structure wherein R' is a $C_1$ to $C_6$ alkyl group, n is 2 and p is 2.

16. The polyurethane elastomer of claim 1 wherein the alkylthioaromatic amine curing agent is at least one member of the group consisting of
2,4-di(methylthio)-meta-phenylenediamine;
4,6-di(methylthio)-meta-phenylenediamine;
2,4-di(ethylthio)-meta-phenylenediamine;
4,6-di(ethylthio)-meta-phenylenediamine;
2,4-di(n-butylthio)-meta-phenylenediamine;
2,5-di(methylthio)-meta-phenylenediamine;
2-(methylthio)-4-(ethylthio)-meta-phenylenediamine;
3,5-di(methylthio)-2,4-diaminotoluene;
3,5-di(ethylthio)-2,4-diaminotoluene;
3,5-di(methylthio)-2,6-diaminotoluene;
3,5-di(propylthio)-2,4-diaminotoluene;
3-(methylthio)-5-(ethylthio)-2,4-diaminotoluene;
3,5-di(methylthio)-2,4-diamino-ethylbenzene;
3,5-di(ethylthio)-2,6-diamino-ethylbenzene;
3,5-di(cyclohexylthio)-2,4-diaminotoluene;
3-(methylthio)-5-(propylthio)-2,6-diamino-ethylbenzene;
3,5-di(methylthio)-2,4-diamino-chlorobenzene;
3,6-di(ethylthio)-2,4-diamino-chlorobenzene;
4,4'-methylenebis[2,6-di(methylthio)aniline];
[3,5-di(methylthio)-4-aminophenyl[3-(methylthio-4-aminophenyl]methane;
4,4'-ethylidenebis[2,6-di(ethylthio)aniline];
4,4'-isopropylidenebis[2,6-di(methylthio)aniline];
[3,5-di(methylthio)-4-aminophenyl][3-5-di(ethylthio)-4aminophenyl]sulfide;
phenyl[3,5-di(methylthio)-2,4-diaminophenyl]methane;
2,6-diamino-3,5-di(n-butylthio-4-bromotoluene; and,
[3,5-di(methylthio)-4-aminophenyl][3,5-di(ethylthio)-4aminophenyl]ether; and, mixtures thereof.

17. The polyurethane elastomer of claim 1 wherein the alkylthioaromatic amine curing agent is a mixture of 3,5-(methylthio)-2,6-diaminotoluene and 3,5-di(methylthio)-2,6-diaminotoluene.

18. The polyurethane elastomer of claim 1 wherein the stoichiometry of the mixture of prepolymer to curing agent is from about 80 to 125.

19. The polyurethane elastomer of claim 1 wherein the stoichiometry of the mixture of prepolymer to curing agent is from 100 to about 120.

20. The polyurethane elastomer of claim 1 wherein the stoichiometry of the mixture of prepolymer to curing agent is from about 110 to 115.

21. The polyurethane elastomer of claim 1 wherein the first and second polyethers are polytetramethylene glycols, the isocyanate is selected from the group consisting of 2,4 toluene diisocyanate, 2,6 toluene diisocyanate and mixtures thereof and the curing agent is a mixture of 3,5-di(methylthio)-2,6-diaminotoluene and 3,5-di(methylthio)-2,6-diaminotoluene.

22. The polyurethane elastomer of claim 1 which has been postcured.

23. The polyurethane elastomer of claim 1 which has been postcured at a temperature of from about 115° to about 160° C.

24. The polyurethane elastomer of claim 1 which has been postcured at a temperature of from about 120° C. to about 140° C.

25. The polyurethane elastomer of claim 21 which has been postcured.

26. The polyurethane elastomer of claim 21 which has been postcured at a temperature of from about 115° C. to about 140° C.

27. The polyurethane elastomer of claim 21 which has been postcured at a temperature of from about 120° C. to about 140° C.

28. A non-pneumatic tire comprising a compression-deformable, load-carrying annular body fabricated from polyurethane elastomer obtained by reacting (a) a mixture of isocyanate-terminated polyether prepolymers formed from the reaction of (i) a first polyether having a molecular weight of from about 200 to about 1500 and terminated with functional groups containing active hydrogen, (ii) a second polyether having a molecular weight of from above about 1,500 to about 6,500 and terminated with functional groups containing active hydrogen and (iii) a multifunctional isocyanate and (b) alkylthioaromatic diamine curing agent under polyurethane elastomer-forming conditions.

29. The non-pneumatic tire of claim 28 wherein the first and second polyethers are polyether polyols.

30. The non-pneumatic tire of claim 28 wherein the first and second polyethers are polytetramethylene ether glycols.

31. The non-pneumatic tire of claim 28 wherein the first polyether has a molecular weight of from about 250 to about 1,000 and the second polyether has a molecular weight of from about 2,000 to about 3,000.

32. The non-pneumatic tire of claim 28 wherein the first polyether has a molecular weight of about 1,000 and the second polyether has a molecular weight of about 2,000.

33. The non-pneumatic tire of claim 28 wherein the molar ratio of first polyether to second polyether is from about 95:5 to about 50:50.

34. The non-pneumatic tire of claim 28 wherein the molar ratio of first polyether to second polyether is from about 90:10 to about 60:40.

35. The non-pneumatic tire of claim 28 wherein the molar ratio of first polyether to second polyether is from about 85:15 to about 80:20.

36. The non-pneumatic tire of claim 28 wherein the isocyanate is selected from the group consisting of 2,4 toluene diisocyanate, 2,6 toluene diisocyanate and mixtures thereof.

37. The non-pneumatic tire of claim 28 wherein the first and second polyethers are polyether polyols and the isocyanate to hydroxyl ratio is from about 1.7:1 to 2.3:1.

38. The non-pneumatic tire of claim 28 wherein the first and second polyethers are polyether polyols and the isocyanate to hydroxyl ratio is from about 1.85:1 to about 2.1:1.

39. The non-pneumatic tire of claim 28 wherein the first and second polyethers are polyether polyols and the isocyanate to hydroxyl ratio is from about 1.95:1 to about 2.15:1.

40. The non-pneumatic tire of claim 28 wherein the alkylthioaromatic amine curing agent possesses at least one aromatic group having thereon at least two alkylthio substituents and at least one amino substituent.

41. The non-pneumatic tire of claim 28 wherein the alkylthioaromatic amine curing agent possesses the structure wherein R' is the same or different alkyl group; R is the same or different and is hydrogen or other substituent which does not adversely affect polyurethane formation; n is 2 or 3, p is 2 or 3 and q is 1 or 2.

42. The non-pneumatic tire of claim 28 wherein the alkylthioaromatic amine curing agent possesses the structure wherein R' is a $C_1$ to $C_6$ alkyl group, n is 2 and p is 2.

43. The non-pneumatic tire of claim 28 wherein the alkylthioaromatic amine curing agent is at least one member of the group consisting of
2,4-di(methylthio)-meta-phenylenediamine;
4,6-di(methylthio)-meta-phenylenediamine;
2,4-di(ethylthio)-meta-phenylenediamine;
4,6-di(ethylthio)-meta-phenylenediamine;
2,4-di(n-butylthio)-meta-phenylenediamine;
2,5-di(methylthio)-meta-phenylenediamine;
2-(methylthio)-4-(ethylthio)-meta-phenylenediamine;
3,5-di(methylthio)-2,4-diaminotoluene;
3,5-di(ethylthio)-2,4-diaminotoluene;
3,5-di(methylthio)-2,6-diaminotoluene;
3,5-di(propylthio)-2,4-diaminotoluene;
3-(methylthio)-5-(ethylthio)-2,4-diaminotoluene;
3,5-di(methylthio)-2,4-diamino-ethylbenzene;
3,5-di(ethylthio)-2,6-diamino-ethylbenzene;
3,5-di(cyclohexylthio)-2,4-diaminotoluene;
3-(methylthio)-5-(propylthio)-2,6-diamino-ethylbenzene;
3,5-di(methylthio)-2,4-diamino-chlorobenzene;
3,6-di(ethylthio)-2,4-diamino-chlorobenzene;
4,4'-methylenebis[2,6-di(methylthio)aniline]:
[3,5-di(methylthio)-4-aminophenyl[3-(methylthio-4aminophenyl]methane:
4,4'-ethylidenebis[2,6-di(ethylthio)aniline]:
4,4'-isopropylidenebis[2,6-di(methylthio)aniline];
[3,5-di(methylthio)-4-aminophenyl][3-5-di(ethylthio)-4aminophenyl]sulfide:
phenyl[3,5-di(methylthio)-2,4-diaminophenyl]methane:
2,6-diamino-3,5-di(n-butylthio-4-bromotoluene: and,
[3,5-di(methylthio)-4-aminophenyl][3,5-di(ethylthio)-4aminophenyl]ether: and, mixtures thereof.

44. The non-pneumatic tire of claim 28 wherein the alkylthioaromatic amine curing agent is a mixture of 3,5-di(methylthio)-2,6-diaminotoluene and 3,5-di(methylthio)-2,6-diaminotoluene.

45. The non-pneumatic tire of claim 26 wherein the stoichiometry of the mixture of prepolymer to curing agent is from about 80 to 125.

46. The non-pneumatic tire of claim 26 wherein the stoichiometry of the mixture of prepolymer to curing agent is from 100 to about 120.

47. The non-pneumatic tire of claim 26 wherein the stoichiometry of the mixture of prepolymer to curing agent is from about 110 to 115.

48. The non-pneumatic tire of claim 26 wherein the first and second polyethers are polytetramethylene glycols, the isocyanate is selected from the group consisting of 2,4 toluene diisocyanate, 2,6 toluene diisocyanate and mixtures thereof and the curing agent is a mixture of 3,5-di(methylthio)-2,6-diaminotoluene and 3,5-di(methylthio)-2,6-diaminotoluene.

49. The non-pneumatic tire of claim 28 wherein the polyurethane elastomer has been postcured.

50. The non-pneumatic tire of claim 28 wherein the polyurethane elastomer has been postcured at a temperature of from about 115° C. to about 160° C.

51. The non-pneumatic tire of claim 28 wherein the polyurethane elastomer has been postcured at a temperature of from about 120° C. to about 140° C.

52. The non-pneumatic tire of claim 48 wherein the polyurethane elastomer has been postcured.

53. The non-pneumatic tire of claim 48 wherein the polyurethane elastomer has been postcured at a temperature of from about 115° C. to about 160° C.

54. The non-pneumatic tire of claim 48 wherein the polyurethane elastomer has been postcured at a temperature of from about 120° C. to about 140° C.

55. The non-pneumatic tire of claim 28 wherein the annular body has a generally cylindrical outer member at the other periphery thereof, a generally cylindrical inner member spaced radially inward from, and coaxial with, said outer member, a plurality of axially extending, circumferentially spaced-apart rib members connected at their corresponding inner and outer ends to said inner and outer cylindrical members, said rib members being generally inclined at an angle of from about 0° to about 75° to radial planes which intersect the rib members at their inner ends, and at least one web member having opposite side faces, said web member having its inner and outer peripheries connected respectively to said inner and outer cylindrical members, said web member being connected on at least one of its side faces to at least one of said rib members to thereby form with said rib member a load-carrying structure for said outer cylindrical member, said load-carrying structure being constructed to permit locally loaded members to buckle.

56. The non-pneumatic tire of claim 55 wherein the annular body has a generally cylindrical outer member at the other periphery thereof, a generally cylindrical inner member spaced radially inward from, and coaxial with, said outer member, a plurality of axially extending, circumferentially spaced-apart rib members connected at their corresponding inner and outer ends to said inner and outer cylindrical members, said rib members being generally inclined at an angle of from about 0° to about 75° to radial planes which intersect the rib members at their inner ends, and at least one web member having opposite side faces, said web member having its inner and outer peripheries connected respectively to said inner and outer cylindrical members, said web member being connected on at least one of its side faces to at least one of said rib members to thereby form with said rib member a load-carrying structure for said outer cylindrical member, said load-carrying structure being constructed to permit locally loaded members to buckle.

57. The non-pneumatic tire of claim 55 wherein the polyurethane elastomer has been postcured.

58. The non-pneumatic tire of claim 56 wherein the polyurethane elastomer has been postcured.

* * * * *